United States Patent [19]

Sarkisian et al.

[11] Patent Number: 5,340,068
[45] Date of Patent: Aug. 23, 1994

[54] RELEASE MECHANISM FOR LOCKING PIVOTABLE LEG

[75] Inventors: Robert Sarkisian, Southfield; James J. Mason, Wixom; David J. Muir, Farmington Hills, all of Mich.

[73] Assignee: Marketing Displays, Inc., Farmington Hills, Mich.

[21] Appl. No.: 925,502

[22] Filed: Aug. 5, 1992

[51] Int. Cl.$^5$ .............................................. F16M 11/00
[52] U.S. Cl. ................................... 248/188.6; 40/612; 248/170
[58] Field of Search ................ 248/188.6, 188.7, 170, 248/166, 168, 434; 40/612, 608; 403/92, 93

[56] References Cited

U.S. PATENT DOCUMENTS

| | | |
|---|---|---|
| 3,646,696 | 3/1972 | Sarkisian . |
| 3,662,482 | 5/1972 | Sarkisian . |
| 3,725,966 | 4/1973 | Blecker .................... 248/188.6 X |
| 3,804,355 | 4/1974 | Uroshevich ................... 248/170 X |
| 4,507,887 | 4/1985 | Seely . |
| 4,548,379 | 10/1985 | Seely et al. . |
| 4,569,499 | 2/1986 | Seely . |
| 4,572,473 | 2/1986 | Seely . |
| 4,592,158 | 6/1986 | Seely . |
| 4,593,879 | 6/1986 | Seely et al. ................... 248/170 X |
| 4,691,892 | 9/1987 | Grewe et al. . |
| 4,694,601 | 9/1987 | Dicke et al. . |
| 4,905,946 | 3/1990 | Wang .......................... 248/170 |
| 4,954,008 | 9/1990 | Dicke . |
| 5,082,221 | 1/1992 | Lai .............................. 248/168 |
| 5,082,222 | 1/1992 | Hsu ........................... 248/188.6 X |
| 5,102,079 | 4/1992 | Lee ........................... 248/170 X |

Primary Examiner—Karen J. Chotkowski
Attorney, Agent, or Firm—Brooks & Kushman

[57] ABSTRACT

A release mechanism for a locking, pivotable leg for an assembly to allow an individual to use his foot to disengage the locking element which locks the pivotable leg into its operative position in which a plurality of such legs engage a supporting surface. The release mechanism includes a release pin having an enlarged head and transmission means to transmit movement of the release pin to the locking element moving it from its operative locking position. Where the locking element is of a type including a locking pin which is biased into a locking pin hole in a base bracket by biasing means such as a leaf spring, the transmission means of the present invention includes a release pin spring shoulder, a locking pin spring groove and a pin slot in the leaf spring disposed to engage these two components. Movement of the release pin causes the release pin spring shoulder to deflect the leaf spring which deflection is transmitted into movement of the locking pin in turn disengaging the locking pin from the locking pin hole in the base bracket, allowing the leg to pivot freely.

17 Claims, 3 Drawing Sheets

RELEASE MECHANISM FOR LOCKING PIVOTABLE LEG

TECHNICAL FIELD

This invention relates to a release mechanism for a locking pin or other locking element which is used to lock a pivotable leg or other member in one or more operative positions.

BACKGROUND ART

Portable assemblies of various types (such as sign assemblies) are commonly provided with supporting legs which are pivotably attached to the mechanism and have a folded position in which the assembly is made more compact for transport and storage, and at least one operative position in which the legs support the assembly. Also typically, the pivotable leg is provided with a locking element, commonly a locking pin, which releasably secures the leg into at least one operative position.

One such assembly including pivotable, lockable legs which may be secured into at least one operative position to support the assembly, is exemplified by the sign and sign stand assembly of U.S. Pat. No. 4,593,879, commonly owned by the owner-assignee of the present invention. Complete aspects of such sign holding assemblies are described in that patent and other commonly held U.S. Pat. Nos. 4,507,887, 4,548,379 and 4,572,473, and to the extent that the release mechanism of the present invention for such a locking pivotable leg relates to such sign holding assemblies, these commonly held patents are incorporated herein by reference.

Presently, the release of such locking elements for disengagement of the pivotable leg from its operative position is accomplished by manual (hand) operation of the user, acting directly on the locking element. Since the most stable designs for such pivotable legs commonly place the base of such an assembly low to the ground, the manual operation of the locking element requires the user to bend over close to the ground and to exert a considerable force in a transverse direction. This can be physically exerting to the user, particularly where the folding of a number of locking legs on a plurality of assemblies is required, as is typical when a number of sign holding assemblies are placed along a length of road under construction or repair.

SUMMARY OF THE INVENTION

The release mechanism for a locking, pivotable leg for the base of an assembly provides a release means capable of being engaged by a user's foot, thus obviating the necessity of having the user bend over each time to operate the release mechanism by hand. The present invention provides a release pin having a head of sufficient size to be conveniently engaged by the operator's foot, and transmission means to transmit the movement of the release pin to the locking element, causing the locking element to be removed from operative engagement where it locks the pivotable leg into operative position. Where the locking element for such a pivotable leg is a locking pin provided with a biasing means which biases the locking engagement into operative position for locking the leg, the release pin of the present invention operates to deflect the biasing means, thus removing the locking pin from operative engagement and unlocking the leg from its locked position. In such an embodiment, the biasing means also provides the transmission means of the present invention and thus movement of the release pin under the force of the operator's foot is transmitted to the locking pin to release the latter from operative engagement.

It is, therefore, an object of the present invention to provide a release mechanism for a locking pivotable leg which supports an assembly, by providing release means selectively operative by a user's foot.

It is a further object of the present invention to provide a release means whereby movement of a release pin engaged by a user's foot is transmitted to cause disengagement of the locking element from its operative position.

It is yet a further object of the present invention to provide a release mechanism of simple and efficient design.

DETAILED DESCRIPTION OF THE PREFERRED EMBODIMENT

Figure 1:
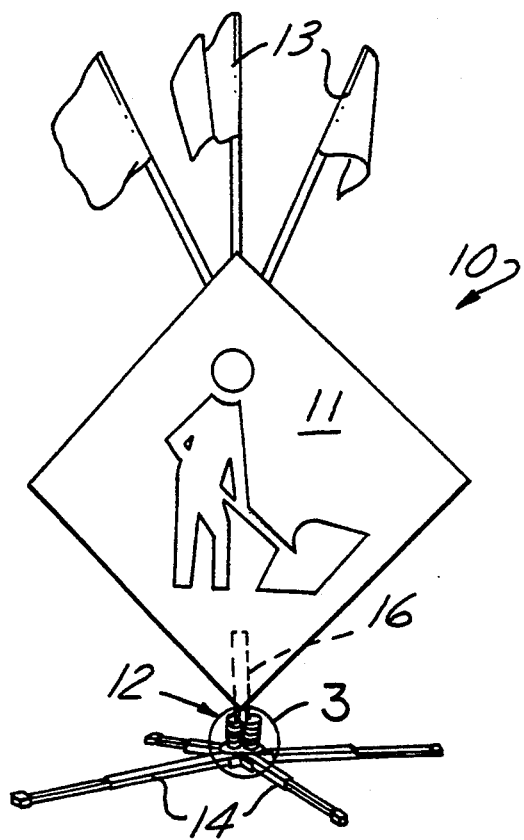
FIG. 1 s an elevational view of an assembly, in this example, a warning sign and stand assembly, having pivotable, locking support legs capable of incorporating the release mechanism of the present invention.

FIG. 1 shows a typical assembly 10, in this example, a traffic warning sign and stand assembly, having pivotable locking support legs of a type which can incorporate the release mechanism of the present invention. The assembly 10 includes a sign 11 mounted on an upright supporting member 16. The support 16 is attached to a base 12 which has a plurality (preferably four) ground engaging members or legs 14. If the sign is used as a notice or warning sign for passing traffic at a construction site, typically a plurality of flags 13 are attached to the sign or the supporting member.

Figure 2:
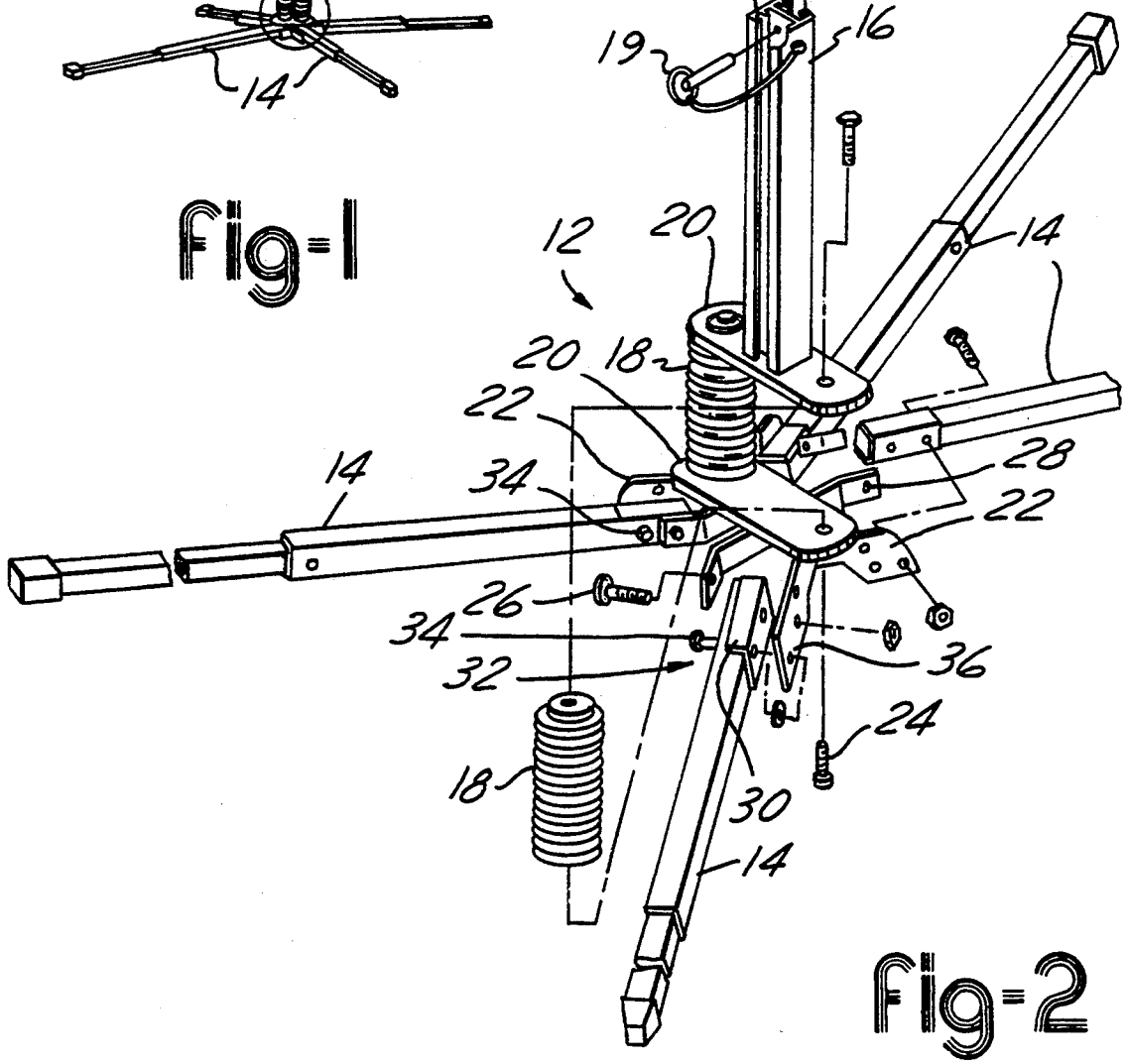
FIG. 2 its an elevational, partially exploded view of a typical base of such an assembly, illustrating various elements which cooperate to allow the pivotable leg to be locked into at least one operative position where it provides support to the assembly.

FIG. 2 shows the base 12 of such a typical assembly 10 including various elements which allow the pivotable connection of legs 14 to base 12. It may be noted that in this example, legs 14 are of an expansible type, having telescoping elements, of any of various designs known to the art, as well as skid-resistant end caps.

FIG. 2 shows that the assembly of this example is a spring mounted assembly in which a supporting column 16 is mounted to the base by two preloaded coil springs 18 held between a pair of spring brackets 20. The brackets 20 in turn are affixed to base brackets 22 by fasteners 24. A pivot pin 26 passes through an inner base bracket 28 and through a leg reinforcing bracket 30 affixed to the proximal end of leg 14 to secure leg 14 to base bracket 22. In this manner, each of legs 14 is pivotably attached to base 12 of assembly 10.

FIG. 2 also illustrates a typical locking element 32 of the prior art. In this case, locking element 32 comprises a retractable locking pin 34 which can engage a first locking pin hole 36 in base bracket 22 to secure pivotable leg 14 in an engagement position in which it is operative to support assembly 10 upon a surface such as the ground. The pivoted attachment of the legs 14 and further details of the locking mechanism are shown in FIGS. 3–8.

The upright supporting member 16 is attached to one of the spring brackets 20 and preferably has a construction and operation the same as that shown and described in U.S. Pat. Nos. 4,548,379 and 4,593,879, the disclosures of which are hereby incorporated herein by reference. In this preferred structure, the support 16 has a pair of opposed elongated channels 15 and the vertical cross-member 17, which is attached to the rear face of the sign 11, is positioned in one of the channels. A hitch pin 19 attached to a short length of chain is used to hold the cross-member 17 and thus the sign 11 in the upright supporting member 16.

Figure 3:
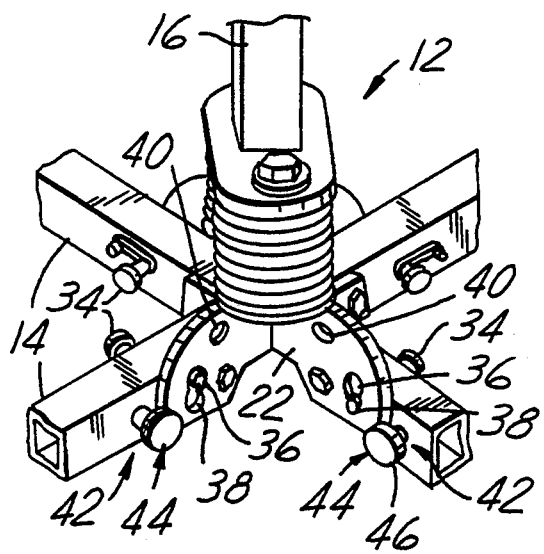
FIG. 3 is an elevational view of the base of an assembly, taken from FIG. 1, illustrating the base with legs locked into an operative position, and incorporating the release mechanism of the present invention.

FIG. 3 shows the base 12 of the assembly 10 in which base brackets 22 have been provided with a plurality of holes (three) in order to secure the legs 14 in different positions. In particular, a second locking pin hole 38 is provided to allow operative engagement of leg 14 in a slightly different position from that for leg 14 when retractable locking pin 34 engages locking pin hole 36. Use of the second locking pin hole 38 for some legs in combination with other legs being secured by use of first locking pin hole 36 may be convenient when the supporting surface is uneven, such as uneven areas of ground. Additionally, base brackets 22 in this example have been provided with a third locking engagement hole 40 to be used to secure legs 14 in a folded, upright position when assembly 10 has been folded for ease of transportation.

FIG. 3 also illustrates a portion of the release mechanism 42 of the present invention, specifically release pin 44 and enlarged release pin head 46, which are described in greater detail below. It may be noted in FIG. 3 that the release pin heads 46 of pairs of release pins 44 are arranged to face each other so that the user need only place his foot in two positions between legs 14 to be capable of engaging all four release mechanisms 42 for all four of legs 14.

Figure 4:
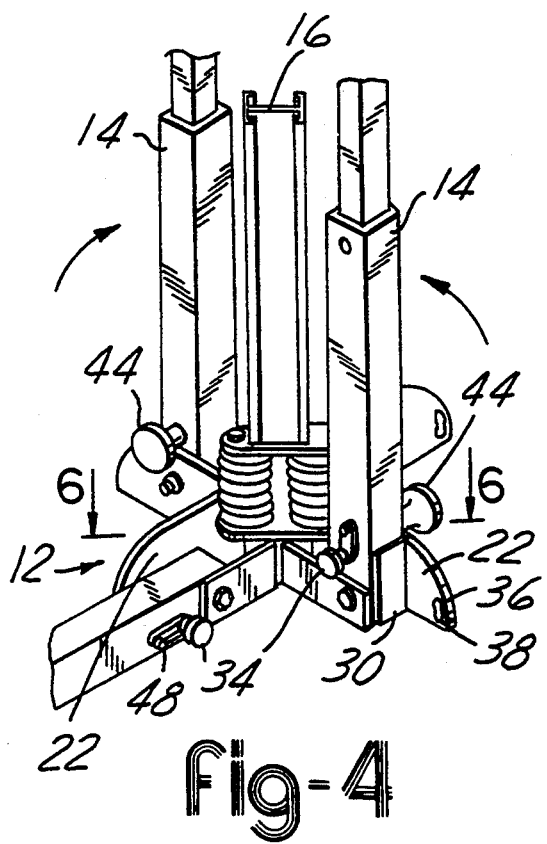
FIG. 4 is an elevational view of the same base area of the assembly, taken at a 90° angle to the perspective of FIG. 3, showing the assembly with three of the legs in their folded position and another leg in its operative position.

FIG. 4 shows a view corresponding to that of FIG. 3, but taken at a 90° angle to FIG. 3, and in which all but one of legs 14 have been placed in their folded position. This figure also shows a retaining clip 48 which helps retain locking pin 34 and release pin 44 within leg 14, as described in greater detail below.

Figure 5:
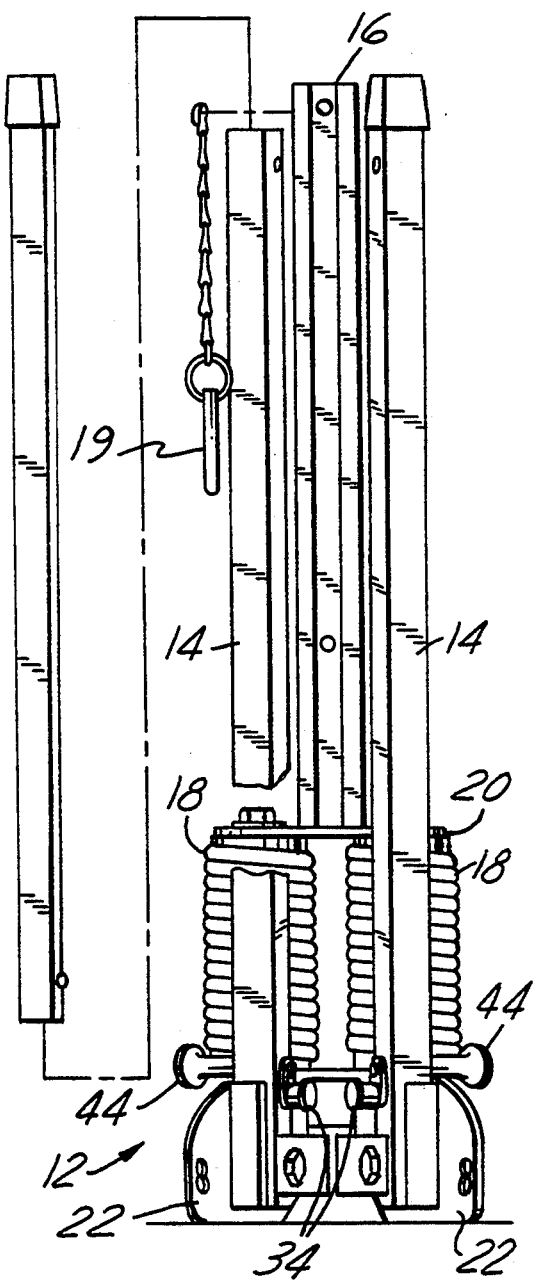
FIG. 5 is a side view of the assembly with the legs in their folded position.

FIG. 5 is a side-view of the base 12 of assembly 10 in which legs 14 have been retracted into a folded position for ease of transportation of assembly 10.

Figure 6:
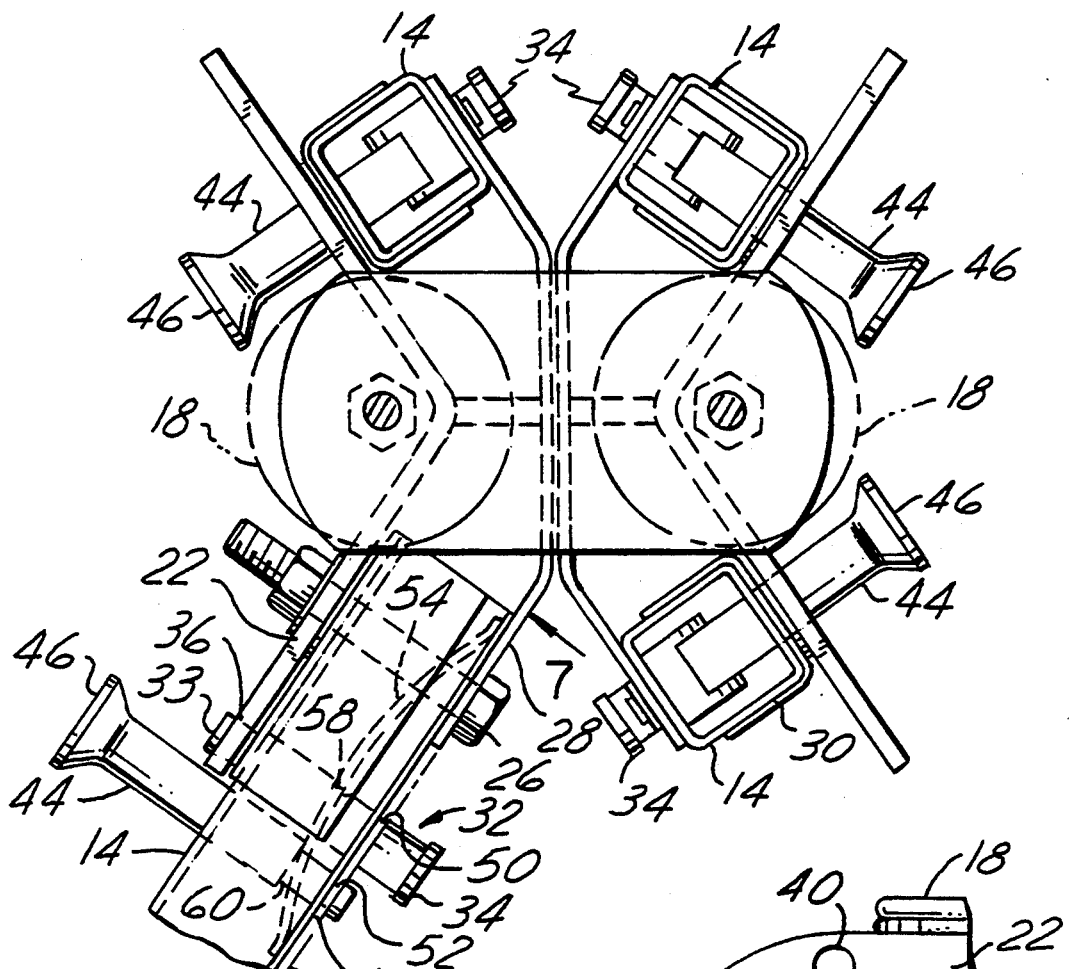
FIG. 6 is a cross-sectional view taken in the direction of arrows 6—6 of FIG. 4 and including partial hidden lines, illustrating the release mechanism of the present invention in relationship to the locking element.
Figure 7:
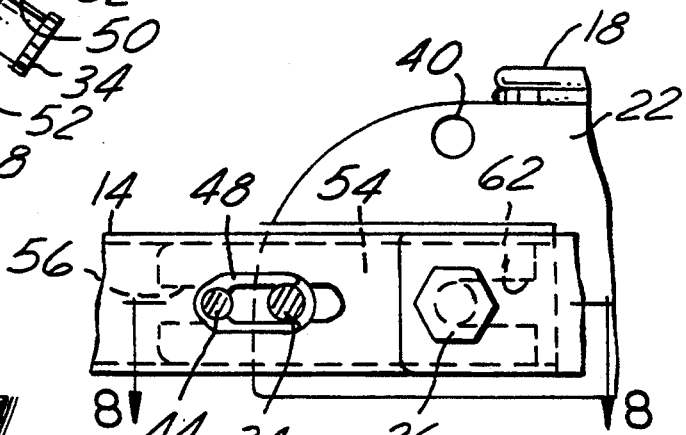
FIG. 7 is a partial side view taken in the direction of arrows 7—7 of FIG. 6 and including partial hidden lines, illustrating the side view of the release mechanism of the present invention in cooperation with the locking element of the assembly.

FIG. 6 illustrates the release mechanism 42 of the present invention and shows its interrelationship with locking element 32. Locking element 32 comprises a retractable locking pin 34 which passes through leg 14 and has an end 33 for engaging locking pin hole 36 (38) in base bracket 22 to lock pivotable leg 14 into an operative position in which it can engage the surface upon which assembly 10 is supported. A U-shaped retaining clip 48 is disposed to engage a locking pin retaining groove 50 in locking pin 34 while simultaneously engaging a release pin retaining groove 52 in release pin 44, to retain the respective pins in operative position within leg 14. As will be appreciated by those skilled in the art, retaining clip 48 serves to secure release pin 44 in leg 14 while at the same time helping to assure that the two pins (44 and 34) operate together.

Figure 8:
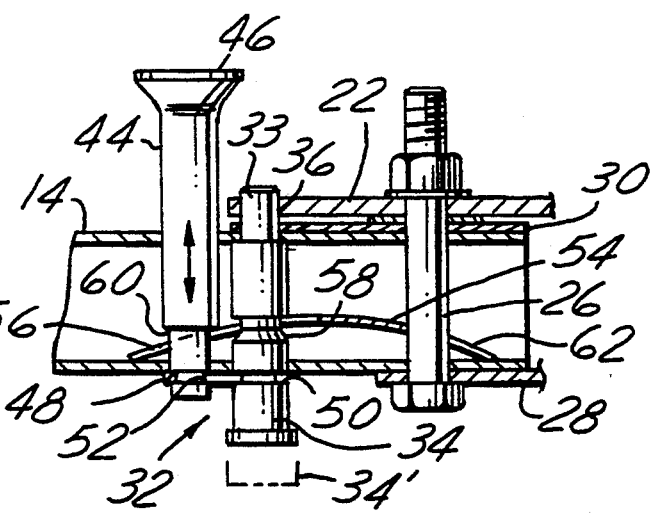
FIG. 8 is a partial cross-sectional view taken in the direction of arrows 8—8 of FIG. 7 illustrating the release mechanism of the present invention in association with the locking element for the pivotable leg of the assembly.

FIGS. 6 and 8 show a biasing means 54 which serves to bias locking pin 34 into operative engagement within locking pin hole 36 of base bracket 22. In this example, biasing means 54 comprises a flat leaf spring, typically formed of metal, with a preset curvature which serves to provide the biasing force earlier described. The leaf spring which comprises biasing means 54 is provided with a U-shaped pin slot or channel 56 shown in FIG. 7, which serves to engage a locking pin spring groove 58 in locking pin 34, while simultaneously bearing against shoulder 60 on release pin 44. The opposite end of leaf spring 54 also has a clearance slot or channel 62 which allows the spring to fit inside the hollow tubular leg 14 and accommodate pivot pin 26.

In operation, the user's foot engages and pushes against release pin head 46 so that the release pin head 46 moves in a direction closer to leg 14. This movement of release pin 44 causes release pin spring shoulder 60 to bear against those portions of leaf spring 54 adjacent pin slot 56 which in turn causes leaf spring 54 to be deflected from its original position. As leaf spring 54 is deflected, the fact that pin slot 56 is in engaging contact with locking pin retaining groove 58, causes locking pin 34 to move in a direction which removes the end 33 of locking pin 34 from operative engagement with locking hole 36 (38) of base bracket 22. Of course, once end 33 of locking pin 34 is disengaged from its locking pin hole, the leg 14 is free to pivot about pivot pin 26 such that leg 14 may be moved into its folded position. Due to the biasing force caused by leaf spring 54 on the locking pin 34, the end 33 of pin 34 will automatically "spring" into the locking hole 40 when the leg reaches its folded storage position. Obviously, release mechanism 42 of the present invention will operate in the identical manner regardless of which locking pin hole 36, 38 or 40 the end 33 of locking pin 34 has been placed.

Although the release pin 44 has an enlarged head 46 to allow for operation by the foot of an operator, it is understood that it is also possible the release pin 44 to be struck or pushed by hand and operated in that manner as well. In addition, it is still possible for the operator to move and fold leg 14 by manual (hand) manipulation of the locking pin 34. The addition of the release pin 44 to the assembly 10 does not prevent operation of the locking pin 34 as previously known, but instead adds an additional (and easier) way to operate the pin 34 and thus release the leg.

In this preferred embodiment of the release mechanism of the present invention, it is seen that shoulder 60 on release pin 44, pin slot 56 on biasing means 54, and groove 58 on locking pin 34 cooperate to comprise transmission means by which movement of release pin 44 is transmitted to locking pin 34 to allow disengagement of end 33 from locking pin holes 36, 38 or 40. Those skilled in the art will appreciate that other embodiments of the transmission means would also serve to transmit movement of release pin 44 into appropriate movement of locking pin 34 to provide such disengagement. For example, such alternative embodiments of transmission means could be provided by a transmission bar such as any rigid element rigidly affixed to both the body of locking pin 34 and the body of release pin 44. Such a rigidly affixed transmission bar might be attached to both respective pins either within the area of those pins inside leg 14 or the area outside leg 14 adjacent to the head of locking pin 34. In this regard, appropriate construction and configuration of retaining clip 48, in cooperation with locking pin retaining groove 50 and release pin retaining groove 52, also serves as a transmission bar to transmit the directional movement of release pin 44 to disengaging movement of locking pin 34.

A simple and efficient design of the preferred embodiment of the invention, by which movement of release pin 44 is directly transmitted into releasing movement of locking pin 34 in the same planar direction, is achieved by positioning release pin 44 coplanar with and generally adjacent to locking pin 34. Nevertheless, those skilled in the art will appreciate that alternative embodiments of the release mechanism 42 may place release pin 44 in alternative positions relative to locking pin 34 with known alternative linkages comprising the transmission means which transmits movement of the release pin 44 into disengaging movement of locking pin 34.

Various parts of the sign stand assembly, such as the upright 16 and legs 14 are preferably made of aluminum, while the springs 18, brackets 20, 22, 28 and 30 are preferably made of steel. Of course, other light-weight materials that are sufficiently strong to withstand the forces to which the signs are normally exposed in use could be utilized. The sign is of any conventional type with a flexible vinyl panel and a pair of fiberglass crossmembers.

Thus, while the foregoing discussion discloses and describes exemplary embodiments of the present invention, those skilled in the art will readily recognize that various changes, modifications and variations may be made without departing from the spirit and scope of the present invention as defined in the following claims.

What is claimed is:

1. An assembly comprising:
   a base for supporting said assembly, said base having at least one locking pin hole;
   at least one leg pivotably attached to said base, said leg capable of being locked into at least one position relative to said base;
   a locking element for locking said leg into said one position, said locking element having a locking pin adapted for operative engagement with said locking pin hole; and
   release means for releasing said locking element from its operative engagement and unlocking said leg from said one position, said release means comprising a movable release pin and transmission means for transmitting movement of said release pin to said locking pin, said transmission means comprising a linkage affixed to said locking pin and to said release pin, wehreby said locking pin is released from operative engagement within said locking pin hole.

2. The assembly of claim 1 wherein said linkage is a rigid member rigidly affixed to said locking pin and said release pin.

3. An assembly comprising:
   a base for supporting said assembly;
   at least one leg pivotably attached to said base, said leg capable of being locked into at least one position relative to said base;
   a locking element placable into operative engagement for locking said leg into said one position;
   biasing means for biasing said locking element into operative engagement in which said locking element locks said leg into one position; and
   release means in operative association with said biasing means for deflecting said biasing means and thereby releasing said locking element from operative engagement with said leg;
   said release means comprising a movable release pin;
   said locking element having a groove for connection with said biasing means;
   said release pin having a shoulder member for connection with said biasing means.

4. The assembly of claim 3 wherein said base comprises at least one locking pin hole, and said locking element comprises a locking pin adapted for operative engagement within said locking pin hole.

5. The assembly of claim 3 wherein said biasing means comprises a leaf spring.

6. The assembly of claim 3 wherein said release pin further comprises a release pin head adapted to be engaged by a user's foot.

7. The assembly of claim 3 further comprising a bracket for connecting together said locking element and said release pin.

8. Release means for an assembly having a movable member with a longitudinal axis and an elongated locking element which may be operatively engaged to lock said member into at least one position, said locking element having a longitudinal axis substantially transverse to said longitudinal axis of said movable member, and said release means adapted to release said locking element from operative engagement, said release means comprising:
   a movable release member, said release member having a longitudinal axis substantially parallel to said longitudinal axis of said locking element; and
   a rigid linkage member for transmitting movement of said release member to said locking element whereby said locking element is released from operative engagement.

9. An assembly comprising:
   a base for supporting said assembly, said base having at least one locking pin hole;
   at least one leg member pivotably attached to said base, said leg member having a longitudinal axis;
   said leg member capable of being locked into at least one position relative to said base;
   a locking member placable into operative engagement for locking said leg member into said one position;
   said locking member having a locking pin adapted for operative engagement within said locking pin hole, said locking pin having a longitudinal axis substantially transverse to said longitudinal axis of said leg member; and release means for releasing said locking element from its operative engagement and unlocking said leg from said one position;

said release means comprising a movable release pin and a linkage member, said linkage member transmitting movement of said release pin to said locking pin, said release pin having a longitudinal axis substantially parallel to said longitudinal axis of said locking pin.

10. A sign stand assembly comprising:

a base member;

an upright member affixed to said base for holding and displaying a sign;

a plurality of leg members each rotatable from a first position deployed in a ground engaging position to support said assembly for display of said sign, to a second position allowing said assembly to form a more compact structure for transport and storage;

locking means for affixing said leg members in at least said first position;

release means for selectively releasing said locking means; and rigid linkage means connecting rigidly together said locking means and said release means;

whereby movement of said release means results in a corresponding movement of said locking means and allows movement of said leg members between said first position and said second position.

11. The assembly of claim 10 further comprising a spring mechanism positioned between said base member and said upright member for allowing relative deflection and return of said upright member relative to said base member.

12. The assembly of claim 10 wherein four leg members are provided.

13. The assembly of claim 10 wherein said locking means comprises a locking pin and said release means comprises a release pin.

14. The assembly of claim 10 wherein said release means is elongated and movable by a force applied in its longitudinal direction.

15. An assembly having a base member and an upright member attached to said base member, said assembly comprising:

a base member;

an upright member attached to said base member;

at least one leg pivotably attached to said base member, said leg capable of being locked into at least one position relative to said base member;

a locking member for locking said leg into said one position;

biasing means connected to said locking member for biasing said locking member into operative engagement in which said locking member locks said leg into said one position;

release means connected to said basing means for deflecting said biasing means and releasing said locking member thereby unlocking said leg from said one position; and rigid linkage means connecting together said locking member and said release means.

16. The assembly of claim 15 wherein said base comprises at least one locking pin hole, and said locking member comprises a locking pin adapted for operative engagement within said locking pin hole.

17. The assembly of claim 15 wherein said biasing means comprises a leaf spring.

* * * * *